(12) United States Patent
Principe et al.

(10) Patent No.: US 9,269,050 B2
(45) Date of Patent: Feb. 23, 2016

(54) CLASSIFICATION USING CORRENTROPY

(75) Inventors: Jose Carlos Principe, Gainesville, FL (US); Abhishek Singh, Champaign, IL (US)

(73) Assignee: University of Florida Reseach Foundation, Inc., Gainesville, FL (US)

( * ) Notice: Subject to any disclaimer, the term of this patent is extended or adjusted under 35 U.S.C. 154(b) by 236 days.

(21) Appl. No.: 13/811,317

(22) PCT Filed: Jul. 22, 2011

(86) PCT No.: PCT/US2011/044932
§ 371 (c)(1),
(2), (4) Date: Jan. 21, 2013

(87) PCT Pub. No.: WO2012/012680
PCT Pub. Date: Jan. 26, 2012

(65) Prior Publication Data
US 2013/0132315 A1    May 23, 2013

Related U.S. Application Data

(60) Provisional application No. 61/366,662, filed on Jul. 22, 2010.

(51) Int. Cl.
*G06E 1/00* (2006.01)
*G06E 3/00* (2006.01)
(Continued)

(52) U.S. Cl.
CPC ............. *G06N 7/00* (2013.01); *G06K 9/6215* (2013.01)

(58) Field of Classification Search
CPC .......... G06N 7/00; G06F 15/18; G06K 9/621; G06K 9/00536; G06K 9/746; G06K 9/6217; H04L 25/061; G06E 1/00; G06E 3/00; G06G 7/00
USPC ........................................................ 706/20
See application file for complete search history.

(56) References Cited

U.S. PATENT DOCUMENTS 8,233,873 B2   7/2012  Principe et al.
8,244,787 B2   8/2012  Principe et al.
(Continued)

OTHER PUBLICATIONS

'Robust Feature Extraction via Information Theoretic Learning': Yuan, 2009, Proceedings 26$^{th}$ annual international conference on machine learning.*

(Continued)

*Primary Examiner* — Wilbert L Starks
*Assistant Examiner* — Peter Coughlan
(74) *Attorney, Agent, or Firm* — Wolf, Greenfield & Sacks, P.C.

(57) ABSTRACT

Various methods and systems are provided for classification using correntropy. In one embodiment, a classifying device includes a processing unit and memory storing instructions in modules that when executed by the processing unit cause the classifying device to adaptively classify a data value using a correntropy loss function. In another embodiment, a method includes adjusting a weight of a classifier based at least in part on a change in a correntropy loss function signal and classifying a data value using the classifier. In another embodiment, a method includes classifying a data value by predicting a label for the data value using a discriminant function, determining a correntopy statistical similarity between the predicted label and an actual label based at least in part on a correntropy loss function, and minimizing an expected risk associated with the predicted label based at least in part on a correntropy statistical similarity.

18 Claims, 14 Drawing Sheets

(51) Int. Cl.
*G06F 15/18* (2006.01)
*G06G 7/00* (2006.01)
*G06N 7/00* (2006.01)
*G06K 9/62* (2006.01)

(56) References Cited

U.S. PATENT DOCUMENTS

| | | |
|---|---|---|
| 8,611,839 B2 | 12/2013 | Principe et al. |
| 2004/0236611 A1 | 11/2004 | Bonissone et al. |
| 2005/0015251 A1 | 1/2005 | Pi et al. |
| 2008/0293372 A1* | 11/2008 | Principe et al. ............... 455/334 |
| 2009/0203343 A1* | 8/2009 | Principe et al. ............... 455/307 |
| 2013/0211829 A1 | 8/2013 | Principe et al. |
| 2014/0193072 A1 | 7/2014 | Principe et al. |

OTHER PUBLICATIONS

'Application of Entropy Concepts to Power System State Estimation': Santos, 2009, Faculdade de Engenharia da Universidade do Porto.*

'Neuro-Fuzzy Classification using the Correntropy criterion: application to sleep depth estimation': Estevez: 2010, IC-AI, 2010.*

The International Search Report and Written Opinion dated Feb. 21, 2012.

Abhishek, et al., "Using Correntropy as a Cost Function in Linear Adaptive Filters," In: Neural Networks, 2009, IJCNN, International Joint Confernece on Jun. 14-19, 2009, pp. 2950-2955.

Abhishek, et al., "A Loss Function for Classification Based on a Robust Similarity Metric," In: Neural Networks (IJCNN) The 2010 International Joint Conference on Jul. 18-23, 2010. pp. 1-6.

* cited by examiner

| # of Training Epochs | 1 | 2 | 3 | 4 | 5 |
|---|---|---|---|---|---|
| C-Loss Mean | - | - | - | - | - |
| Square Loss Mean | 73.99 | 75.49 | 75.72 | 75.71 | 75.68 |

| 6 | 7 | 8 | 9 | 10 | # of Training Epochs |
|---|---|---|---|---|---|
| 76.23 | 76.27 | 76.25 | 76.28 | 76.31 | C-Loss Mean |
| 75.64 | 75.63 | 75.48 | 75.40 | 75.35 | Square Loss Mean |

Percentage of correct classification with 5 PEs in hidden layer

| # of Training Epochs | 1 | 2 | 3 | 4 | 5 |
|---|---|---|---|---|---|
| C-Loss Mean | - | - | - | - | - |
| Square Loss Mean | 74.96 | 75.71 | 75.76 | 75.74 | 75.65 |

| 6 | 7 | 8 | 9 | 10 | # of Training Epochs |
|---|---|---|---|---|---|
| 76.46 | 76.61 | 76.58 | 76.50 | 76.45 | C-Loss Mean |
| 75.63 | 75.59 | 75.53 | 75.51 | 75.43 | Square Loss Mean |

Percentage of correct classification with 10 PEs in hidden layer

| # of Training Epochs | 1 | 2 | 3 | 4 | 5 |
|---|---|---|---|---|---|
| C-Loss Mean | - | - | - | - | - |
| Square Loss Mean | 73.83 | 74.42 | 74.41 | 74.82 | 74.78 |

| 6 | 7 | 8 | 9 | 10 | # of Training Epochs |
|---|---|---|---|---|---|
| 75.90 | 76.09 | 76.04 | 75.99 | 75.97 | C-Loss Mean |
| 74.65 | 74.51 | 74.31 | 74.42 | 74.37 | Square Loss Mean |

Percentage of correct classification with 20 PEs in hidden layer

| # of Training Epochs | 1 | 2 | 3 | 4 | 5 |
|---|---|---|---|---|---|
| C-Loss Mean | - | - | - | - | - |
| Square Loss Mean | 96.56 | 96.82 | 96.88 | 96.89 | 96.89 |

| 6 | 7 | 8 | 9 | 10 | # of Training Epochs |
|---|---|---|---|---|---|
| 96.95 | 96.96 | 96.96 | 96.99 | 96.99 | C-Loss Mean |
| 96.88 | 96.89 | 96.84 | 96.80 | 96.78 | Square Loss Mean |

Percentage of correct classification with 5 PEs in hidden layer

| # of Training Epochs | 1 | 2 | 3 | 4 | 5 |
|---|---|---|---|---|---|
| C-Loss Mean | - | - | - | - | - |
| Square Loss Mean | 96.46 | 96.93 | 96.95 | 96.95 | 96.94 |

| 6 | 7 | 8 | 9 | 10 | # of Training Epochs |
|---|---|---|---|---|---|
| 96.98 | 96.99 | 97.04 | 97.04 | 97.05 | C-Loss Mean |
| 96.95 | 96.94 | 96.91 | 96.89 | 96.85 | Square Loss Mean |

Percentage of correct classification with 10 PEs in hidden layer

| # of Training Epochs | 1 | 2 | 3 | 4 | 5 |
|---|---|---|---|---|---|
| C-Loss Mean | - | - | - | - | - |
| Square Loss Mean | 96.45 | 96.95 | 96.99 | 96.96 | 96.99 |

| 6 | 7 | 8 | 9 | 10 | # of Training Epochs |
|---|---|---|---|---|---|
| 97.02 | 97.05 | 97.07 | 97.07 | 97.07 | C-Loss Mean |
| 96.93 | 96.90 | 96.87 | 96.83 | 96.80 | Square Loss Mean |

Percentage of correct classification with 20 PEs in hidden layer

CLASSIFICATION USING CORRENTROPY

CROSS REFERENCE TO RELATED APPLICATIONS

This application is the 35 U.S.C. 5371 national stage of PCT application PCT/US2011/044932, filed Jul. 22, 2011, which claims priority to and the benefit of U.S. Provisional Application No. 61/366,662, filed Jul. 22, 2010, both of which are hereby incorporated by reference in their entirety.

STATEMENT REGARDING FEDERALLY SPONSORED RESEARCH OR DEVELOPMENT

This invention was made with Government support under Grant ECS-0601271 awarded by the National Science Foundation. The Government has certain rights in this invention.

BACKGROUND

Classification assigns labels to data based upon a decision rule. A convex surrogate loss function is used as the training loss function in many classification procedures. Within the statistical learning community, convex surrogates are preferred because of the virtues that convexity brings—unique optimum, efficient optimization using convex optimization tools, amenability to theoretical analysis of error bounds, etc. However, convex functions are poor approximations for a wide variety of problems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Figure 1:
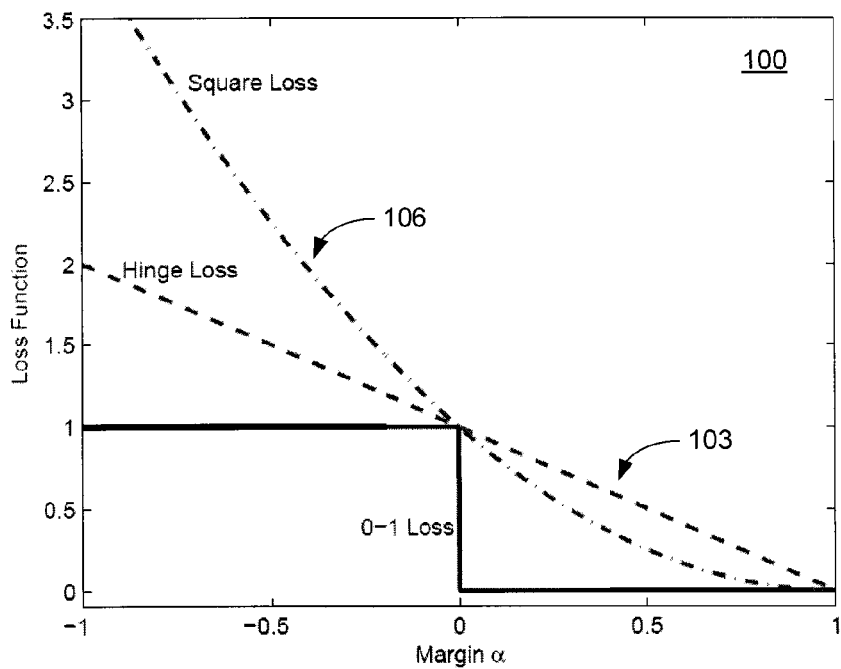
FIG. 1 is a graph illustrating examples of surrogate loss functions in accordance with various embodiments of the present disclosure.

Embodiments disclosed herein include systems and methods for robust classification using correntropy. For example, this application describes a loss function for classification that is induced by correntropy, referred to as the c-loss function. A discriminant function is obtained by optimizing the c-loss function using a neural network that is substantially insensitive to outliers and resilient to overfitting and overtraining. This potentially leads to better generalization performance when compared to a squared loss function, which is common in neural network classifiers. The described methods of training classifiers may provide a practical way of obtaining better results on real world classification problems, and an exemplary embodiment uses a simple gradient-based online training procedure for reducing the empirical risk.

Classification aims at assigning class labels to data (patterns) using an 'optimal' decision rule that is learned using a set of pre-labeled training samples. This 'optimal' decision rule or discriminant function $f$ is learned by minimizing an empirical risk, which is a sample average of a loss function. The loss (a function of the prediction $f(x)$ and the true label y) may be thought of as the price paid for predicting the label to be $f(x)$, instead of y. The procedure for learning the discriminant function $f$ is called empirical risk minimization.

A natural loss function for classification is the misclassification error rate (or the 0-1 loss) stated in:

$$l_{0-1}(f(x),y)=\|(-yf(x))_+\|_0, \qquad \text{EQN. 1}$$

where $(.)_+$ denotes the positive part and $\|.\|_0$ denotes the $L_0$ norm. The misclassification error rate may be thought of as a count of the number of incorrect classifications made by the discriminant function $f$. Therefore, a 0-1 loss function directly relates to the probability of misclassification.

Optimization of the risk based on such a loss function, however, is computationally intractable due to its non-continuity and non-convexity. Therefore, a surrogate loss function is used as the training loss function. Correntropy between two random variables is a generalized correlation function or a robust measure of statistical similarity, that makes use of higher order statistics. In a classification setting, maximizing the similarity between the prediction $f(x)$ and the target y in the correntropy sense effectively induces a non-convex, smooth loss function (or c-loss) that may be used to train the classifier using an online gradient based technique. This loss function is used to train a neural network classifier using backpropagation without an increase in computational complexity.

Given a sample set of observations $D_n=\{(x_i,y_i), i=1, 2, \ldots, n\}$, assumed to be independent and identically distributed (i.i.d.) realizations of a random pair (X, Y), the goal of classification is to select a function $f$ from a class of functions $\mathcal{F}$, such that the sign of $f(x)$ is an accurate prediction of Y under an unknown joint distribution P(X, Y). Here, X∈X is the input vector and Y∈{−1, 1} is the class label. In other words, select $f \in \mathcal{F}$ that minimizes the risk R($f$) given by:

$$R(f)=E[l_{0-1}(Yf(X))]=P(Y \neq \text{sign}(f(X))). \qquad \text{EQN. 2}$$

The product yf(x) is called the margin (denoted by α) and can be treated as a measure of correctness of the decision for the sample X. Given the sample set $D_n$ of realizations, an empirical risk (e.g., the sample average of the 0-1 loss) is as expressed by:

$$\hat{R}(f) = \frac{1}{n}\sum_{i=1}^{n} l_{0-1}(y_i f(x_i)). \qquad \text{EQN. 3}$$

Optimization of the empirical risk as expressed above, however, is computationally intractable primarily because of the discontinuity of the 0-1 loss function. Due to the discontinuity of the 0-1 loss function, the optimization procedure involves choosing a surrogate $\phi(\alpha)=\phi(yf(x))$ as the loss function. What results is the minimization of the $\phi$-risk and empirical $\phi$-risk defined by:

$$R_\phi(f) = E[\phi(Yf(X))] \qquad \text{EQN. 4}$$

$$\hat{R}_\phi(f) = \frac{1}{n}\sum_{i=1}^{n} \phi(y_i f(x_i)) \qquad \text{EQN. 5}$$

Referring to FIG. 1, shown is a graph 100 of two commonly used surrogate loss functions $\phi$ versus a margin $\alpha$. The first surrogate loss function $\phi$ (103) is a hinge loss function used in support vector machines (SVMs). The SVM uses the hinge loss, $[1-yf(x)]_+$. The second surrogate loss function $\phi$ (106) is a square loss function used in training neural networks, radial basis function networks, etc. The loss function for training the weights of a neural network or a radial basis function network is typically the square loss function, $(y-f(x))^2$, or $(1-yf(x))^2$.

Within the statistical learning community, convex surrogates of the 0-1 loss function are preferred because of the virtues that convexity brings: unique optima, efficient optimization using convex optimization tools, amenability to theoretical analysis of error bounds, etc. However, convex surrogates are poor approximations to the 0-1 loss function. Convex surrogates tend to be boundless and offer poor robustness to outliers. Another important limitation is that the complexity of convex optimization algorithms grows quickly as the amount of data increases.

There is a large class of problems where optimization cannot be done using convex programming techniques. For example, the training of deep networks for large scale artificial intelligence (AI) problems primarily relies on online, gradient-based methods. Such neural network based classification machines can benefit from non-convex surrogates, as they can potentially be closer approximations to the 0-1 loss function. Additionally, non-convex surrogates can have better scalability, robustness, and generalization performance. Although non-convex surrogates do not offer many theoretical guarantees, the empirical evidence that they work better in practical engineering applications is overwhelming.

An example of a loss function for classification that utilizes a statistical measure called correntropy is described. Correntropy is a generalized correlation function or a robust measure of statistical similarity between two random variables that makes use of second and higher order statistics. In a classification setting, maximizing the similarity between the prediction $f(x)$ and the target y in the correntropy sense, effectively generates (i.e., induces) a non-convex, smooth loss function (referred to as a c-loss function) that can be used to train the classifier using an online gradient-based technique. The c-loss function is used to train a neural network classifier using backpropagation. Without any increase in computational complexity, a better generalization performance on real world datasets may be obtained using the c-loss function when compared to the traditional squared loss function in neural network classifiers.

Cross correntropy, or simply correntropy, between two random variables X and Y is a generalized similarity measure defined as:

$$v(X,Y)=E[\kappa_\sigma(X-Y)], \qquad \text{EQN. 6}$$

where $\kappa_\sigma$ is a Gaussian kernel with width parameter $\sigma$. In practice, given only a finite number of realizations of the random variables, correntropy between the random variables is computed as:

$$\hat{v}(X,Y) = \frac{1}{n}\sum_{i=1}^{n} \kappa_\sigma(x_i - y_i) \qquad \text{EQN. 7}$$

Correntropy is a measure of how similar two random variables are, within a small neighborhood determined by the kernel width $\sigma$. In contrast, metrics like mean squared error (MSE) provide a global measure. The localization provided by the kernel width proves to be very useful in reducing the detrimental effects of outliers and impulsive noise.

In a classification setting, the similarity between the classifier output and the true label is maximized, in the correntropy sense. Therefore, the loss function should be chosen such that minimization of the expected risk is equivalent to maximization of correntropy. The correntropy induced loss function or the c-loss function is defined as:

$$l_C(y,f(x))=\beta[1-\kappa_\sigma(y-f(x))] \qquad \text{EQN. 8}$$

The c-loss function can also be expressed in terms of the classification margin $\alpha=yf(x)$ as:

$$l_C(\alpha) = \beta[1 - \kappa_\sigma(1-\alpha)], \qquad \text{EQN. 9}$$

$$= \beta[1 - \kappa_\sigma(1 - yf(x))], \qquad \text{EQN. 10}$$

where $\beta$ is a positive scaling constant chosen such that $l_C(\alpha=0)=1$. Therefore, $$\beta = \left[1 - \exp\left(\frac{-1}{2\sigma^2}\right)\right]^{-1}.$$

Figure 2:
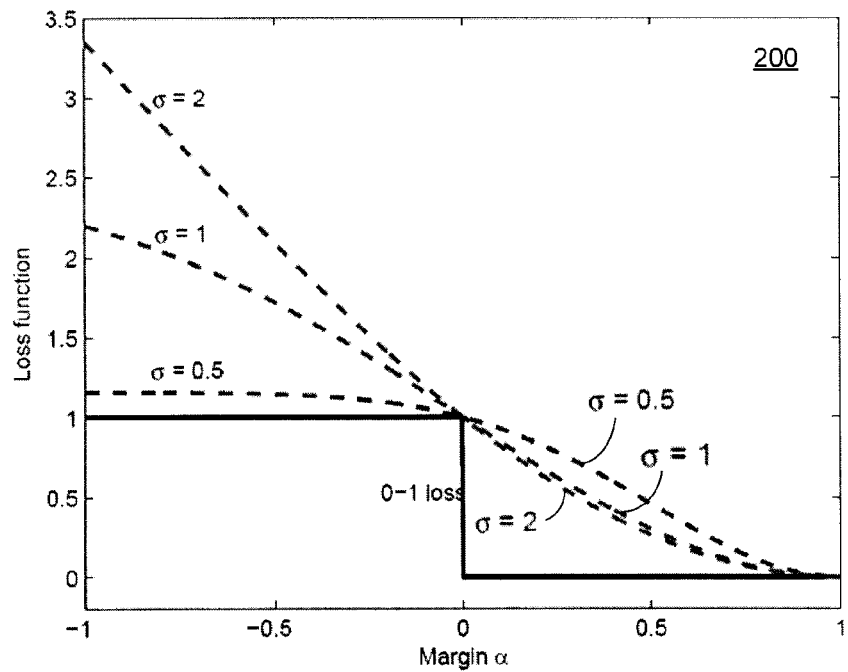
FIG. 2 is a graph illustrating examples of correntropy loss (c-loss) functions in accordance with various embodiments of the present disclosure.

Referring next to FIG. 2, shown is a graph 200 of the c-loss function for different values of the kernel width parameter $\sigma$ plotted against the margin $\alpha$. The 0-1 loss is also shown. As can be seen in FIG. 2, the G-loss function is a better approximation of the 0-1 loss function as compared to the squared or hinge loss functions, which are illustrated in FIG. 1.

The expected risk associated with the c-loss function is expressed by:

$$R_C(f) = \beta(1 - E[\kappa_\sigma(1 - yf(x))]) \qquad \text{EQN. 11}$$

$$= \beta(1 - E[\kappa_\sigma(y - f(x))]) \qquad \text{EQN. 12}$$

$$= \beta(1 - v(Y, f(X))) \qquad \text{EQN. 13}$$

Minimizing the expected risk is equivalent to maximizing the similarity (in the correntropy sense) between the predicted label $f(x)$ and the true label y. Upon changing variables based on $\epsilon=Y-f(X)$, the estimator of correntropy can be written as:

$$\hat{v}(\varepsilon) = \frac{1}{n}\sum_{i=1}^{n}\kappa_\sigma(e_i) \qquad \text{EQN. 14}$$

From the Parzen density estimation principle, it can be seen that EQN. 14 is an estimator of the probability density function (pdf) of $\epsilon$, evaluated at 0. Therefore, maximizing the correntropy of the errors $\epsilon$ of a classifier, essentially maximizes $p(\epsilon=0)$. This is a more natural quantity to optimize for a classifier, as compared with quantities such as the sum of squared errors.

Figure 3:
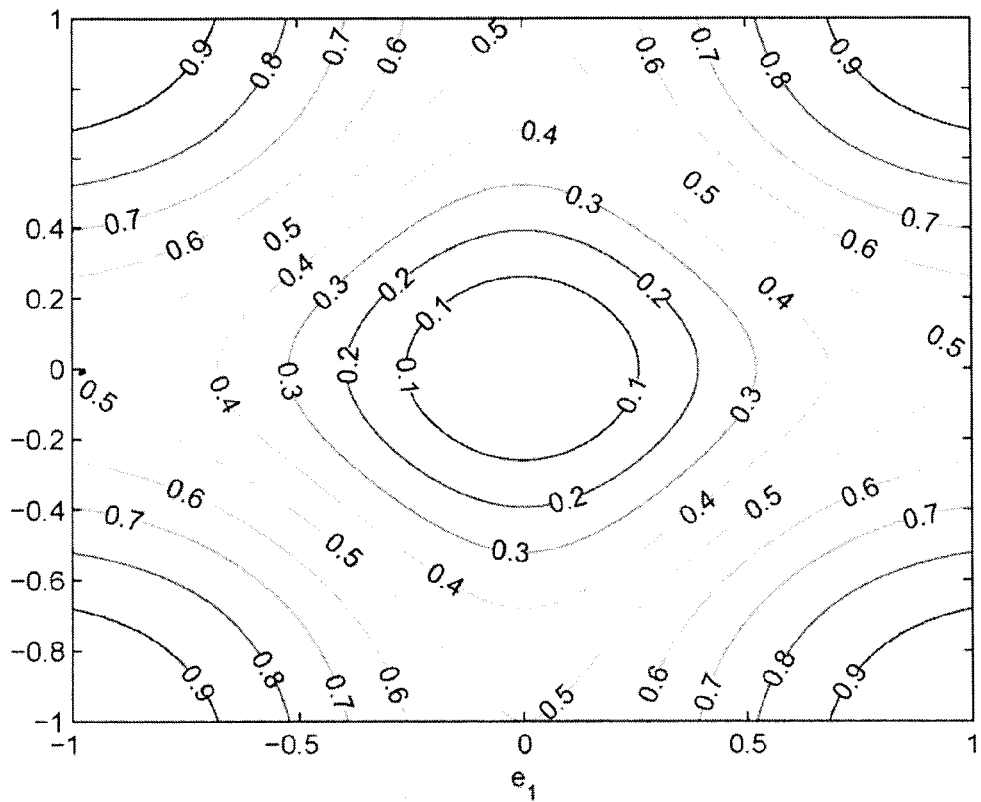
FIG. 3 is an example of an empirical risk function in a 2D space of errors in accordance with various embodiments of the present disclosure.

In the space of the errors $e=y-f(x)$, the empirical risk obtained using the c-loss function behaves like the $L_2$ norm for small errors (i.e., samples correctly classified with high confidence). As the errors increase, it behaves like the $L_1$ norm and approaches the $L_0$ norm for very large errors (i.e., misclassified samples). The kernel size (or, equivalently, the distance from the origin in the space of errors) dictates the rate at which the empirical risk transitions from $L_2$ to $L_0$ behavior in the error space. FIG. 3 depicts an example of the transition from an $L_2$ norm like behavior close to the origin, to $L_0$ behavior far away, with an $L_1$ like region in between. The empirical risk function in the 2D space of errors $e=y-f(x)$ of FIG. 3 was obtained using the c-loss function with $\sigma=0.5$.

The c-loss function is a non-convex function of the margin. Therefore, it is difficult to optimize the c-loss function using sophisticated convex optimization techniques in order to obtain the optimal discriminant function $f$. However, since the c-loss function is a smooth function, it is possible to optimize the c-loss function using, for example, a first order (steepest descent) or a second order (e.g., Newton's method) gradient-based procedure, or a combination thereof (e.g., a conjugate gradient, a Hessian approximation method (e.g., a Levenberg-Marquardt algorithm)). The c-loss function is used to train a neural network classifier by backpropagating the errors using any of the gradient-based methods discussed above.

From the equations involved in backpropagation, it can be observed that the magnitude of the derivative of the loss function, with respect to the current value of the error, controls the size of the steps in the weight update equation. In other words, the derivative of the loss evaluated at the current value of the error, controls how much the discriminant function (weights) are influenced by the input sample that produced the error.

Figure 4:
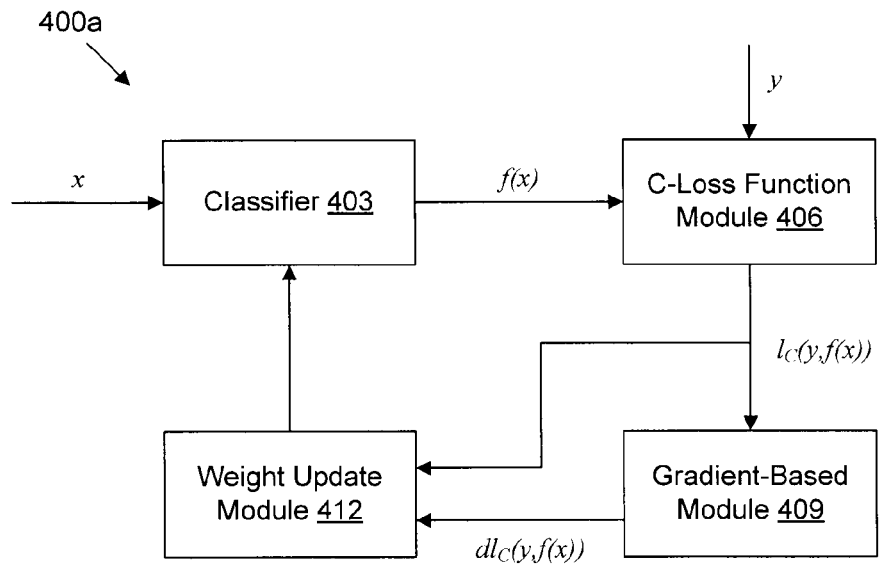
FIGS. 4 and 6 are graphical representations of examples of systems for robust classification using c-loss functions of FIG. 2 in accordance with various embodiments of the present disclosure.

FIG. 4 is a block diagram illustrating a nonlimiting embodiment of a system for robust classification using correntropy. The system 400a includes a classifier 403, a c-loss function module 406, a gradient-based module 409, and a weight update module 412. The classifier 403 classifies a value of x by predicting the label to be $f(x)$. The c-loss function module 406 determines a statistical similarity between the predicted label $f(x)$ and the true label y using correntropy as described in EQN. 7 above. The c-loss function module 406 outputs a c-loss value described by EQNS. 9 and 10 above.

The gradient-based module 409 calculates a change in the c-loss values, which minimizes the expected risk as described in EQN. 14 above, for example. In various embodiments, the gradient-based module 409 is a first, second, or mixed order gradient-based module, for example. The gradient-based module 409 outputs the change to the weight update module 412, which updates the weights for the classifier based at least in part on a c-loss value and the change in c-loss values calculated by the gradient-based module 409.

The c-loss function is a non-convex function of the margin. Therefore it is difficult to optimize it using sophisticated convex optimization techniques, in order to obtain the optimal discriminant function $f$. However, since it is a smooth function, it is possible to optimize it using gradient based procedures. We therefore use the c-loss function to train a neural network classifier by backpropagating the errors using gradient descent.

Before deriving the backpropagation equations, the notation used to denote the variables in a neural network is summarized below for convenience.

$w_{jk}{}^n$: The weight between the processing element (PE) k and the PE j of the previous layer, at the $n^{th}$ iteration.

$y_j{}^n$: Output of the PE j of the previous layer, at the $n^{th}$ iteration.

$net_k{}^n = \Sigma_j w_{jk}{}^n y_k{}^n$: Weighted sum of all outputs $y_j{}^n$ of the previous layer, at the $n^{th}$ iteration.

g( ): Sigmoidal squashing function in each PE, $$g(z) = \frac{1-e^{-z}}{1+e^{-z}} \qquad \text{EQN. 15}$$

$y_k{}^n = g(net_k{}^n)$: Output of the PE k of the current layer, at the $n^{th}$ iteration.

$y^n \in \{\pm 1\}$: The true label (or desired signal), for the $n^{th}$ sample.

The weights of a multilayer perception (MLP) may be updated by moving opposite to the gradient of the empirical risk computed using the c-loss function:

$$w_{jk}^{n+1} = w_{jk}^n - \mu \frac{\partial R_C(e)}{\partial w_{jk}^n}. \qquad \text{EQN. 16}$$

Using the chain rule, the above equation can be written as:

$$w_{jk}^{n+1} = w_{jk}^n + \mu \frac{\partial R_C(e)}{\partial e_n} g'(net_k^n) y_j^n. \qquad \text{EQN. 17}$$

Since this is an online procedure, the derivative of the risk with respect to the error at $n^{th}$ iteration, $e_n$, is essentially the derivative of the c-loss function, evaluated at $e_n$. Therefore, $$w_{jk}^{n+1} = w_{jk}^n + \mu \frac{\partial l_C(e)}{\partial e_n} g'(net_k^n) y_j^n. \qquad \text{EQN. 18}$$

The above equation is the general rule for updating all the weights of the MLP, and it is called the Delta rule, written simply as:

$$w_{jk}^{n+1} = w_{jk}^n + \mu \delta_k^n y_j^n, \qquad \text{EQN. 19}$$

where, $$\delta_k^n = \frac{\partial l_C(e)}{\partial e_n} g'(net_k^n). \qquad \text{EQN. 20}$$

Depending on the cost function, and the type of weights (belonging to output layer or hidden layer), the computation of $\delta_k^n$ in the above equation differs. For the output layer weights, the computation is as follows:

$$\delta_k^n = \delta_o^n \qquad \text{EQN. 21}$$

$$= \frac{\partial l_C(e)}{\partial e_n} g'(net_o^n)$$

$$= \beta_1 \cdot \exp\left(\frac{-(y^n - y_o^n)^2}{2\sigma^2}\right)(y^n - y_o^n)g'(net_o^n) \qquad \text{EQN. 22}$$

where $\beta_1 = \beta/\sigma^2$. For the previous (hidden) layer, the 'deltas' are computed as:

$$\delta_k^n = \delta_h^n = g'(net_k^n) \sum_{o=1}^{N_o} \delta_o^n w_{ho}^n \qquad \text{EQN. 23}$$

where $N_o$ is the number of output layer PEs.

EQNS. 22 and 23 can be used to update or train the weights of a neural network classifier using the c-loss function. The computational complexity of the weight updates remains the same as in the case of the conventional square loss function.

From EQNS. 19 and 20, it can be seen that the magnitude of the derivative of the loss function, with respect to the current value of the error, essentially controls the size of the steps in the weight update equation. In other words, the derivative of the loss evaluated at the current value of the error, controls how much the discriminant function (weights) are influenced by the input sample that produced the error.

Figure 5:
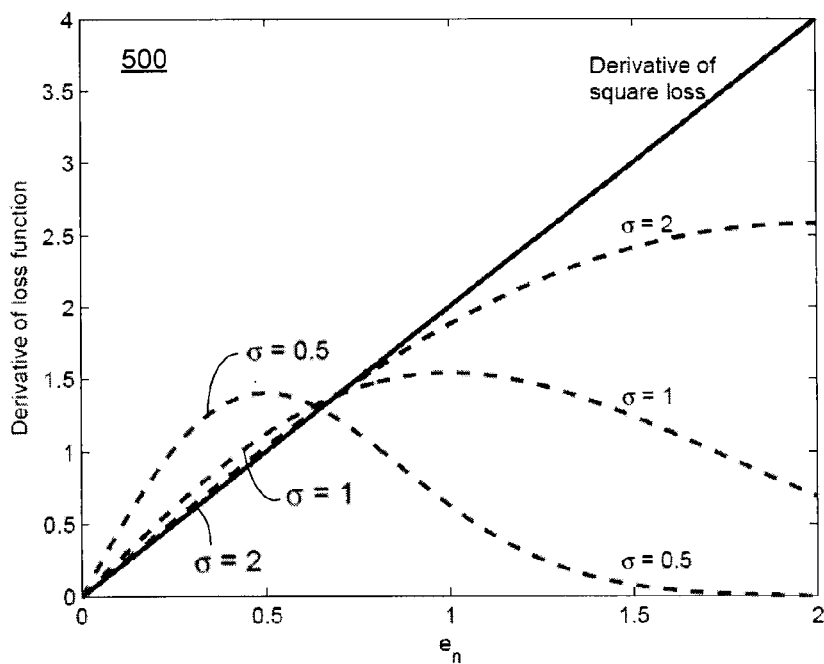
FIG. 5 is a graph illustrating an example of derivatives of a c-loss function versus kernel width in accordance with various embodiments of the present disclosure.

Referring to FIG. 5, shown is a graph 500 illustrating an example of derivatives of the c-loss function versus kernel width σ. For comparison purposes, the derivative of the square loss function (which results in a linear function) is also shown. The derivatives are plotted as a function of the error $e_n$ produced by the $n^{th}$ input sample. Therefore, if $1 < |e_n| < 2$, the sample is misclassified, and if $0 < |e_n| < 1$, the sample is correctly classified. As can be seen in FIG. 4, if the square loss function is used, the samples which produce high errors (i.e., samples which are badly misclassified) yield a high derivative. This means that the weights or the decision boundary of the classifier is highly affected by outliers or impulsive input samples. In contrast, the derivative of the c-loss function attenuates the influence of highly erroneous samples while computing the weights or the discriminant function. Since the discriminant function is insensitive to these outliers, better generalization can be obtained in real world datasets which are often plagued with noisy samples.

Also, for a kernel size like σ=0.5, the effect of samples near the decision boundary (e=1) is also attenuated. This means that 'confusing' samples which lie near the decision boundary are not given much importance while learning the classifier. This results in a more regularized solution that is less prone to overfitting due to overtraining.

The localization provided by the kernel in the c-loss function makes the gradient descent algorithm susceptible to getting stuck in local minima. Therefore, the c-loss function may be useful primarily in the vicinity of the optimal solution. One approach is to first allow convergence using the traditional square loss function and then switch to the c-loss function. Another approach using a weighted combination of the two loss functions instead is described by:

Combined loss function=α*(C−loss)+(1−α)*(Square−loss)   EQN. 15

The value of α is linearly increased from 0 to 1, over the total number of training epochs. Therefore, for the $i^{th}$ epoch, $\alpha_i = i/N$, where N is the total number of training epochs. Such an approach means that the square loss function is used in the beginning of training, and there is a smooth switch over to the c-loss function towards the end of training.

Figure 6:
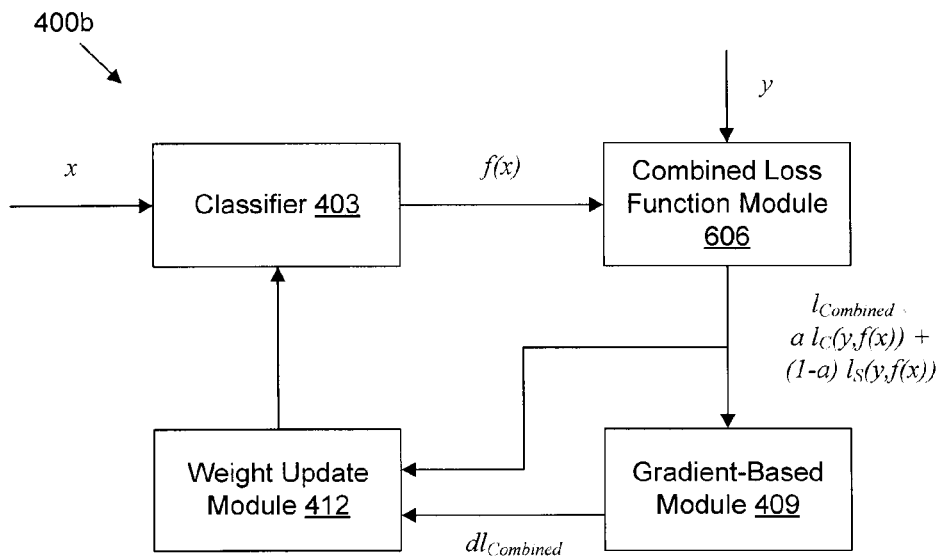

Referring to FIG. 6, shown is a block diagram illustrating another nonlimiting embodiment of a system for robust classification using correntropy. Similar to the system 400a illustrated in FIG. 4, the system 400b in FIG. 6 includes a classifier 403, a gradient-based module 409, and a weight update module 412. However, the system 400b includes a combined loss function module 606 instead of merely a c-loss function module 406. The combined loss function module 606 determines a statistical similarity using a weighted combination of the c-loss function and the square loss function. The combined loss function module 606 outputs a combined loss function based at least in part on EQN. 15 above.

Figure 7:
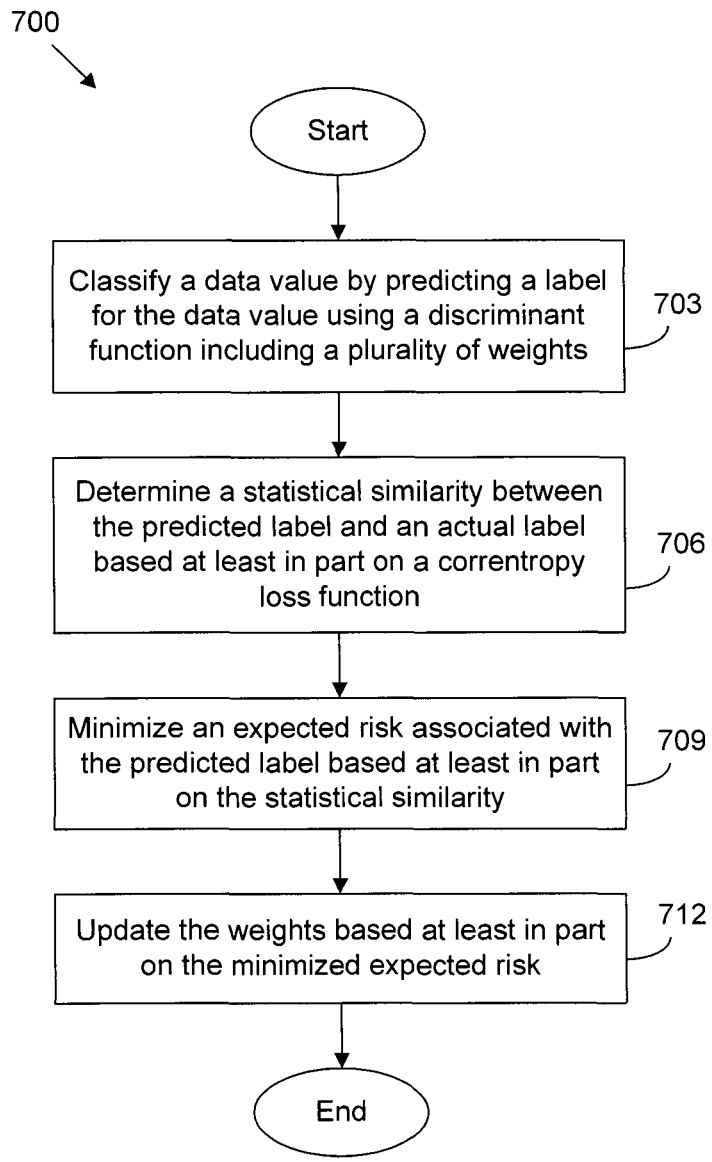
FIG. 7 is a flow chart illustrating an example of robust classification using the systems of FIGS. 4 and 6 in accordance with various embodiments of the present disclosure.
Figure 8A:
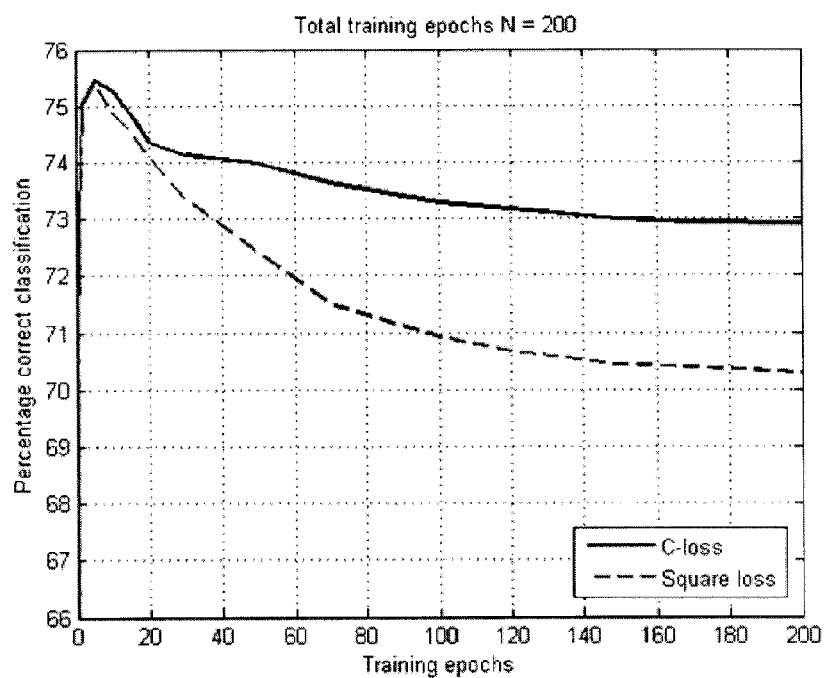
FIGS. 8A-8F, 9A-9C, and 10A-10C are graphs of examples of classification results based at least in part upon a c-loss function module using the systems of FIGS. 4 and 6 in accordance with various embodiments of the present disclosure.
Figure 8B:
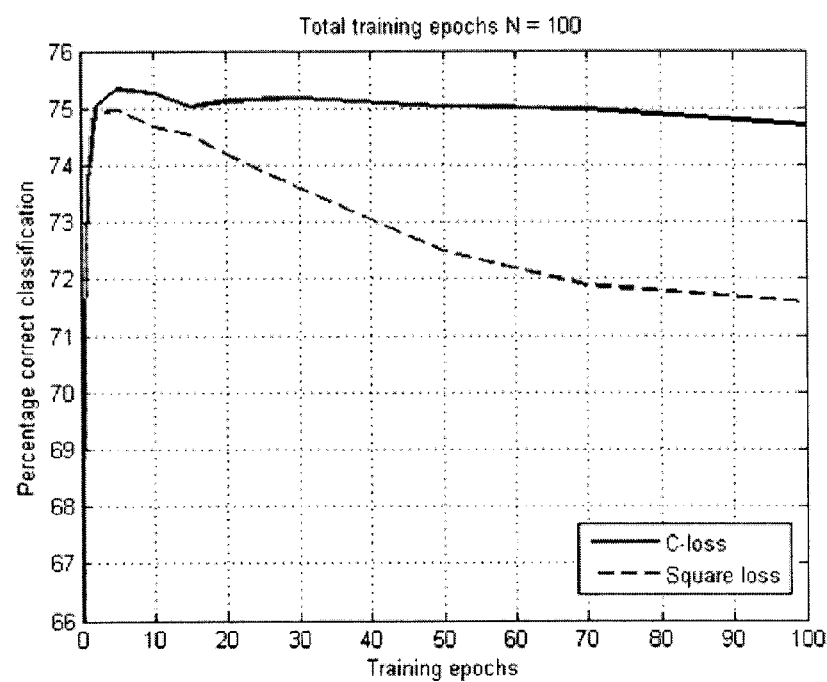
Figure 8C:
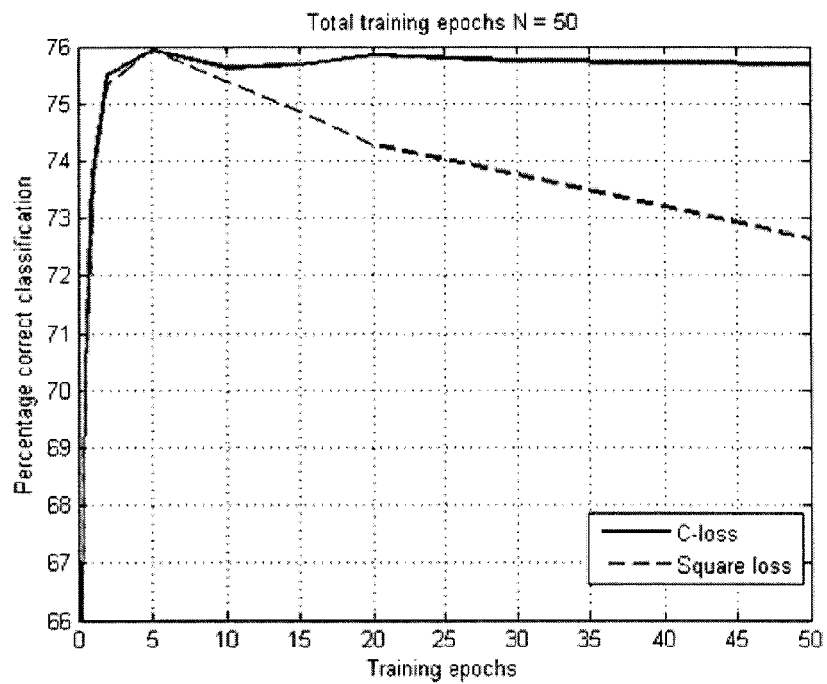
Figure 8D:
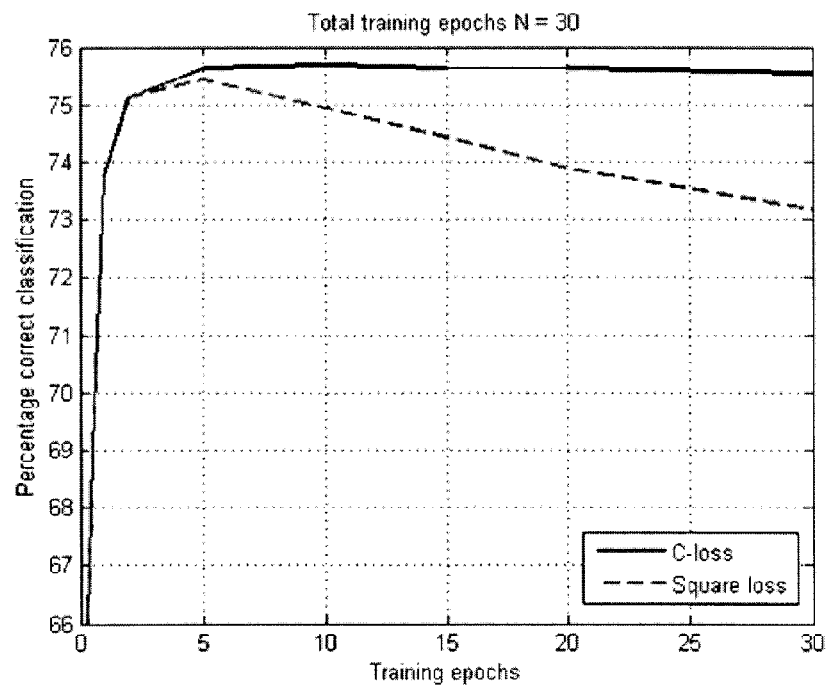
Figure 8E:
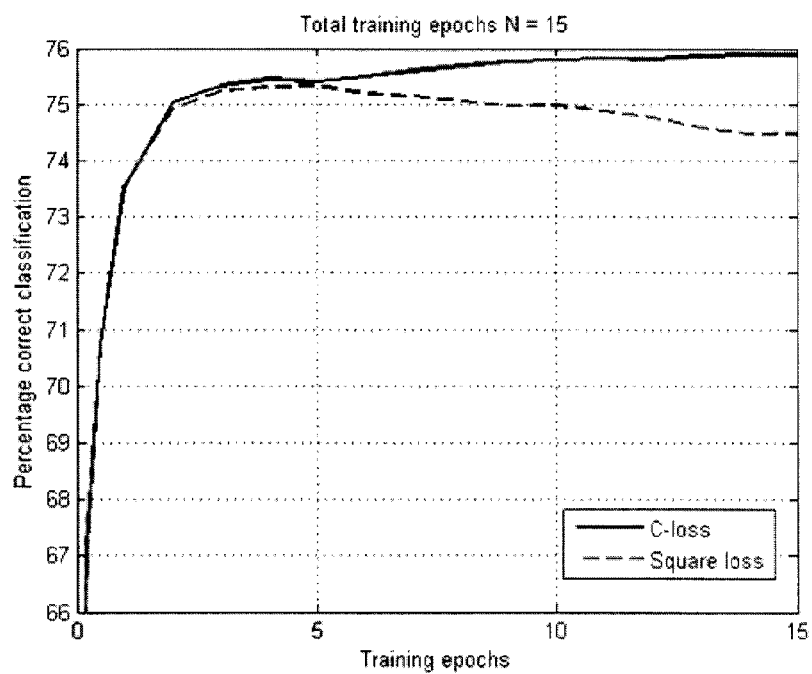
Figure 8F:
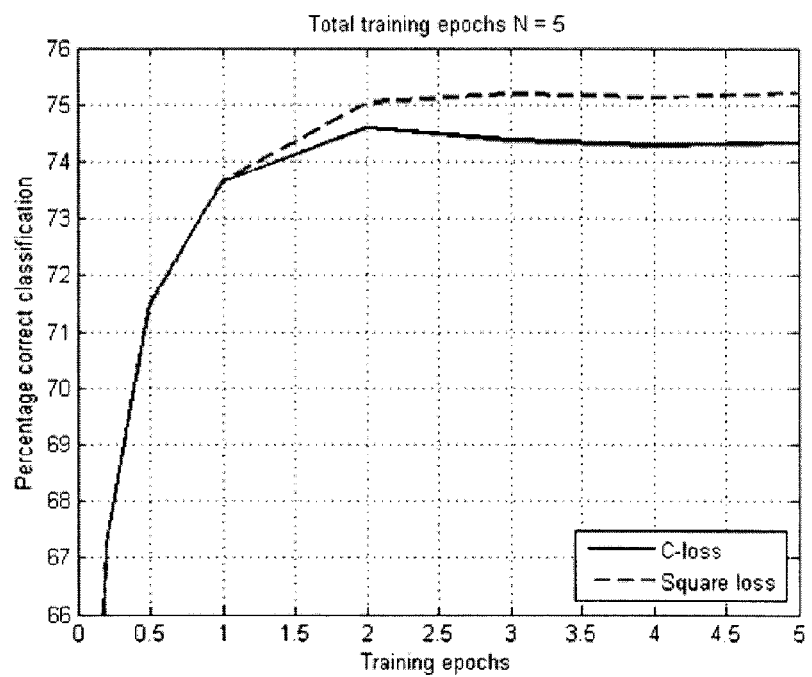

FIG. 7 is a flow chart illustrating a nonlimiting embodiment of a method of robust classification using correntropy. The method 700 includes boxes 703, 706, 709, and 712. In box 703, a data value is classified by predicting a label for the data value using a discriminant function including a plurality of weights. In box 706 a statistical similarity between the predicted label and an actual label is determined based at least in part on a correntropy loss function. In some embodiments, the statistical similarity is also based at least in part on a square loss function. Further, the statistical similarity may be based at least in part on a weighted combination of the correntropy loss function and the square loss function (referred to herein as a combined loss function). In box 709, the expected risk associated with the predicted label is minimized based at least in part on the statistical similarity. The minimization of the expected risk includes calculating a gradient of (i.e., change in) the statistical similarity. In box 712, the weights of the discriminant function are updated based at least in part on the minimized expected risk.

For purposes of comparison, the performance of neural network classifiers trained with the c-loss function and the traditional square loss function were used in classifying the Pima Indians Diabetes dataset. This data includes eight physiological measurements (features) from 768 subjects. The objective was to classify a test subject into either the diabetic or non-diabetic group, based on these physiological measurements. Out of the 768 samples, 400 samples were used to train the classifier, and the remaining samples were used to test for generalization.

Networks having a single hidden layer and a sigmoidal non-linearity are used in each of the PEs. The datasets used are normalized to have unit variance along each feature. The networks were trained with 10 epochs of the training dataset. The kernel size a in the c-loss function was set to be 0.5. Other values of kernel size such as 0.6 and 0.7 were also tried, with little change in performance. The generalization performance for both the methods was obtained by testing on a separate test dataset.

FIGS. 8A-8F are graphs of percentage of correct classification for a system 400 including a c-loss function module and a system including a square loss function, versus number of training epochs, for the Pima Indians Diabetes dataset. The total number of training epochs varies in each figure such that the total number of training epochs is respectively 200, 100, 50, 30, 15, and 5 in FIGS. 8A, 8B, 8C, 8D, 8E, and 8F. In these evaluations, the G-loss function was implemented using the combined loss function as described by EQN. 15, in order to avoid local minima. FIGS. 8A-8F illustrate how the G-loss function improves the classification performance compared to the square loss function, over the training epochs. These plots were obtained after averaging over 100 Monte Carlo simulations with random initial weights of the network and random selection of training samples from the datasets.

Figure 9A:
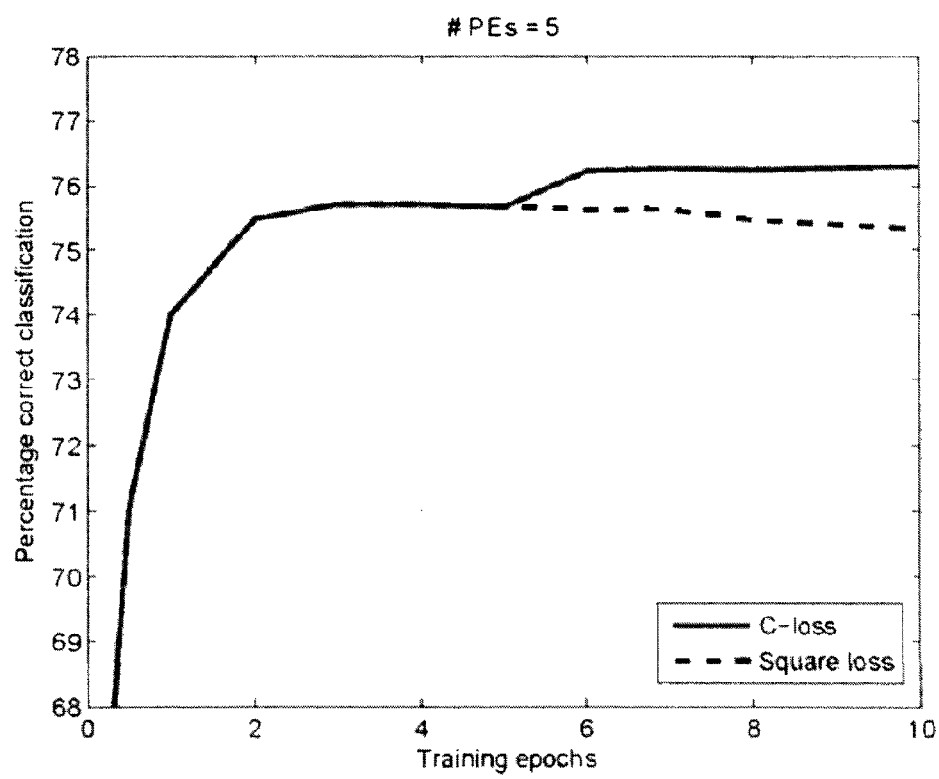
Figure 9B:
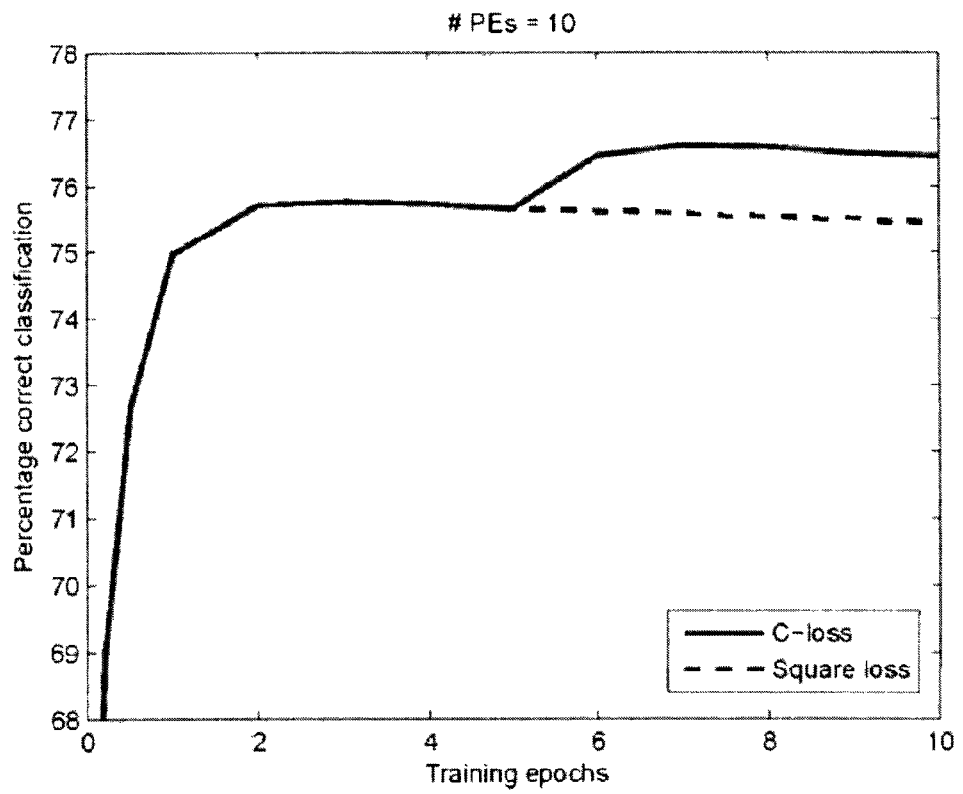
Figure 9C:
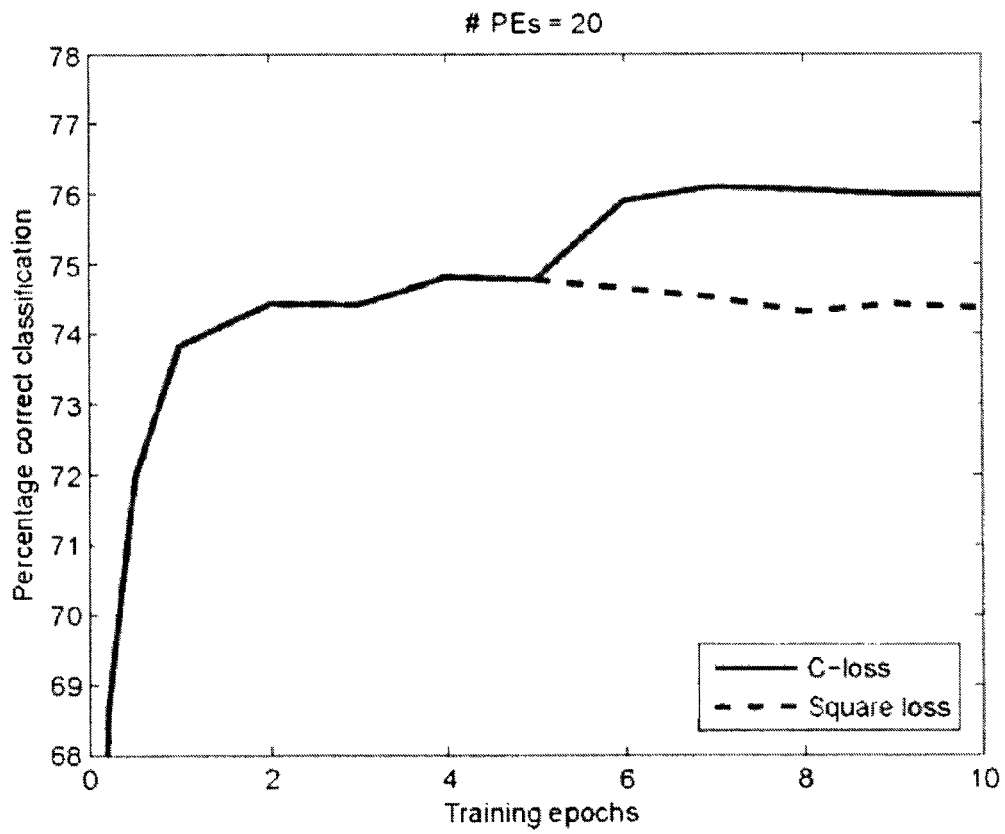

In addition, the effect of the number of PEs on the classification results was examined using the Pima Indians Diabetes dataset. The evaluation was repeated with 5, 10 and 20 PEs in the hidden layer of the MLP using the two loss functions. Referring to FIGS. 9A-9C, shown are the graphs of examples of the percentage of correct classification for 5, 10 and 20 PEs in the hidden layer, respectively. The average classification performance (on the test set) computed from 100 Monte Carlo trials is shown for different training durations (epochs). The tables in FIGS. 9A, 9B, and 9C illustrate the evaluation results for 5, 10 and 20 PEs, respectively. In each of the three tables, the best performance of c-loss function is better than that obtained by the square loss. In these evaluations, in order to avoid local optima, training was carried out by first training with the square loss function and then switching over to the c-loss function. Since the switch to the c-loss function is made only after the 5th epoch, the first 5 values for the c-loss results are not shown. As indicated in the graphs of FIGS. 9A-9C, generalization performance improves with use of the c-loss function.

Figure 10A:
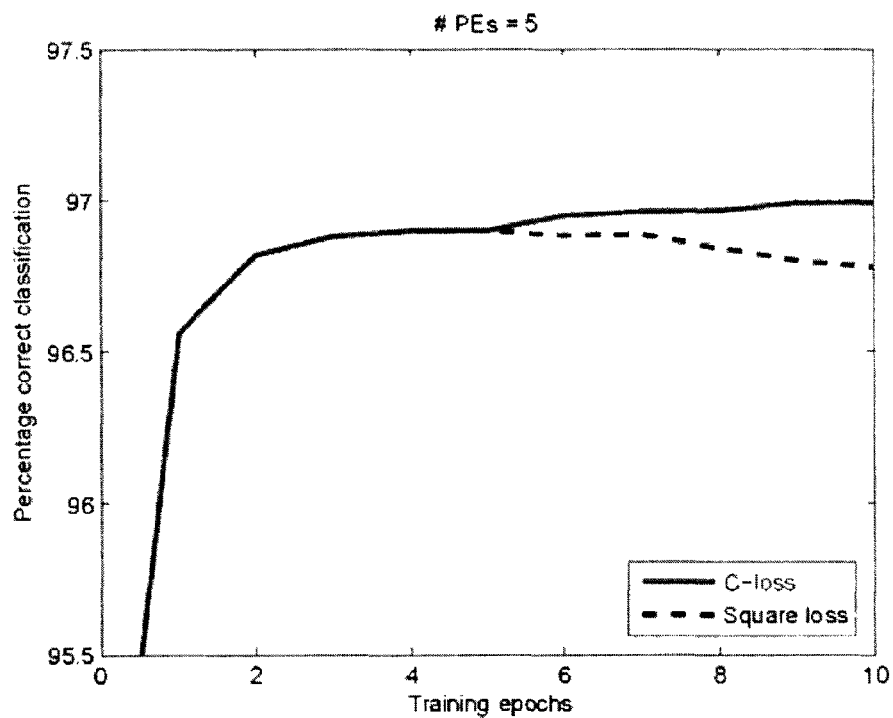
Figure 10B:
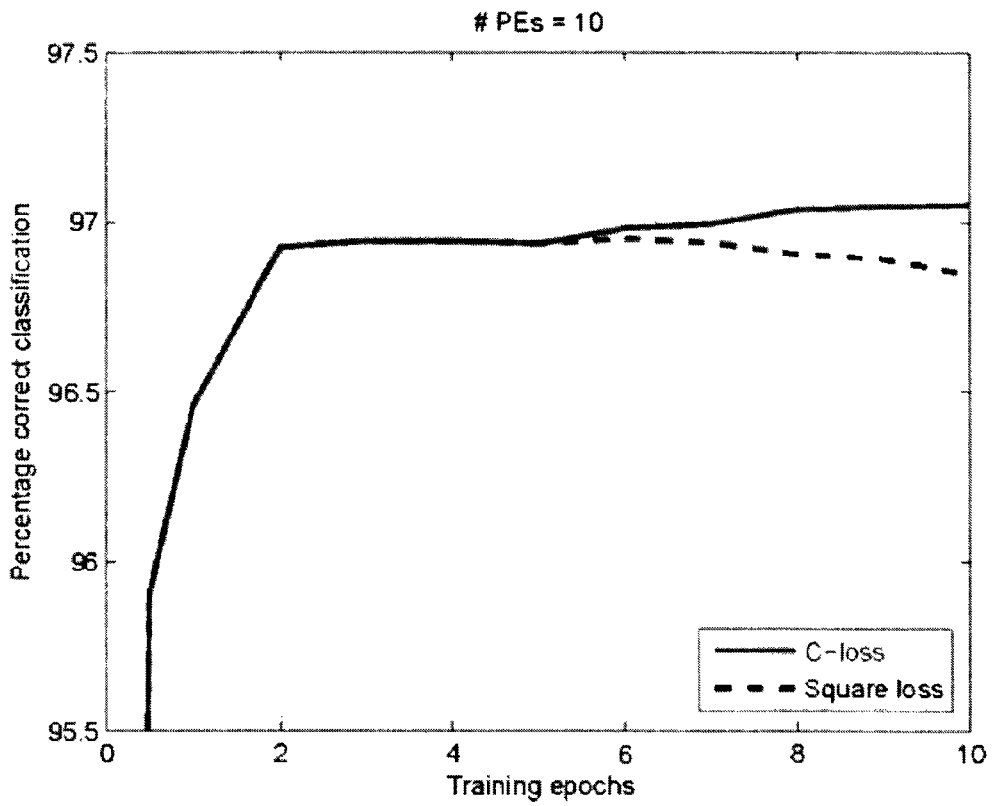
Figure 10C:
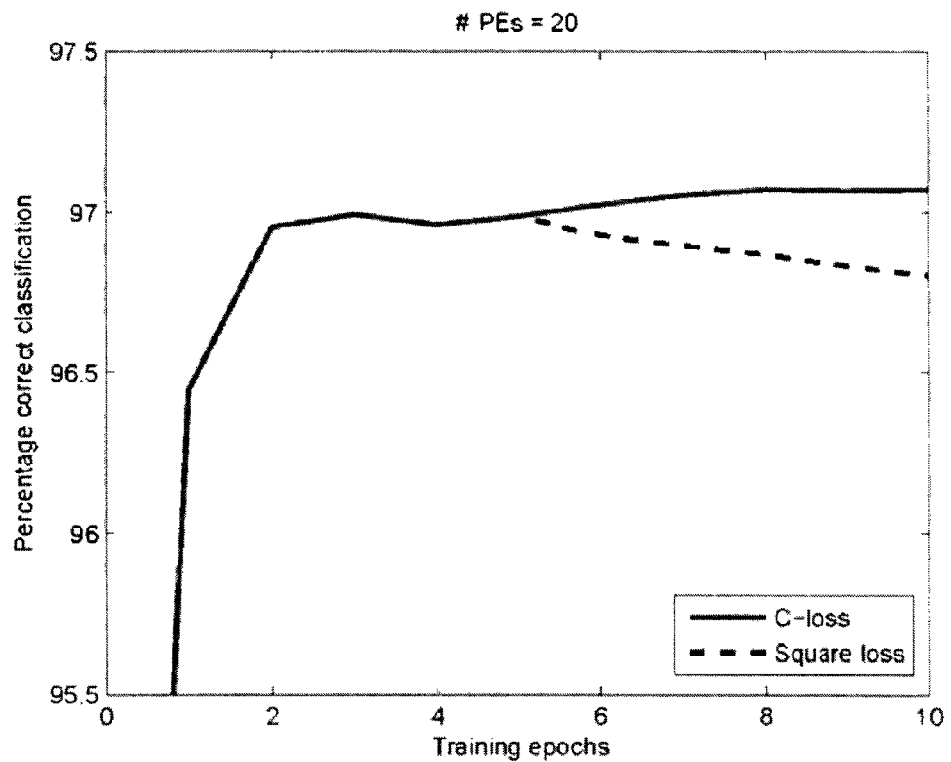

Comparison of the classification using a c-loss function module and using a square loss function was also performed using a Wisconsin Breast Cancer dataset. This dataset consists of nine-dimensional samples, belonging to two classes. Out of the 683 samples, 300 were used to train the classifiers. Referring to FIGS. 10A-10C, shown are the graphs of examples of the percentage of correct classification for 5, 10 and 20 PEs in the hidden layer, respectively. Along the same lines as the examination of FIGS. 9A-9C, the mean classification performance is tabulated for both the loss function, for various training epochs. The c-loss function again outperforms the square loss function in terms of generalization. As indicated in the graphs of FIGS. 10A-9C, the use of the c-loss function after the 5th epoch provides an improvement in classification performance.

The systems and methods provided herein can be implemented in hardware, software, firmware, or a combination thereof. In one embodiment, the method can be implemented in software or firmware that is stored in a memory and that is executed by a suitable instruction execution system. If implemented in hardware, as in an alternative embodiment, the system can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), digital signal processor (DSP), etc.

Figure 11:
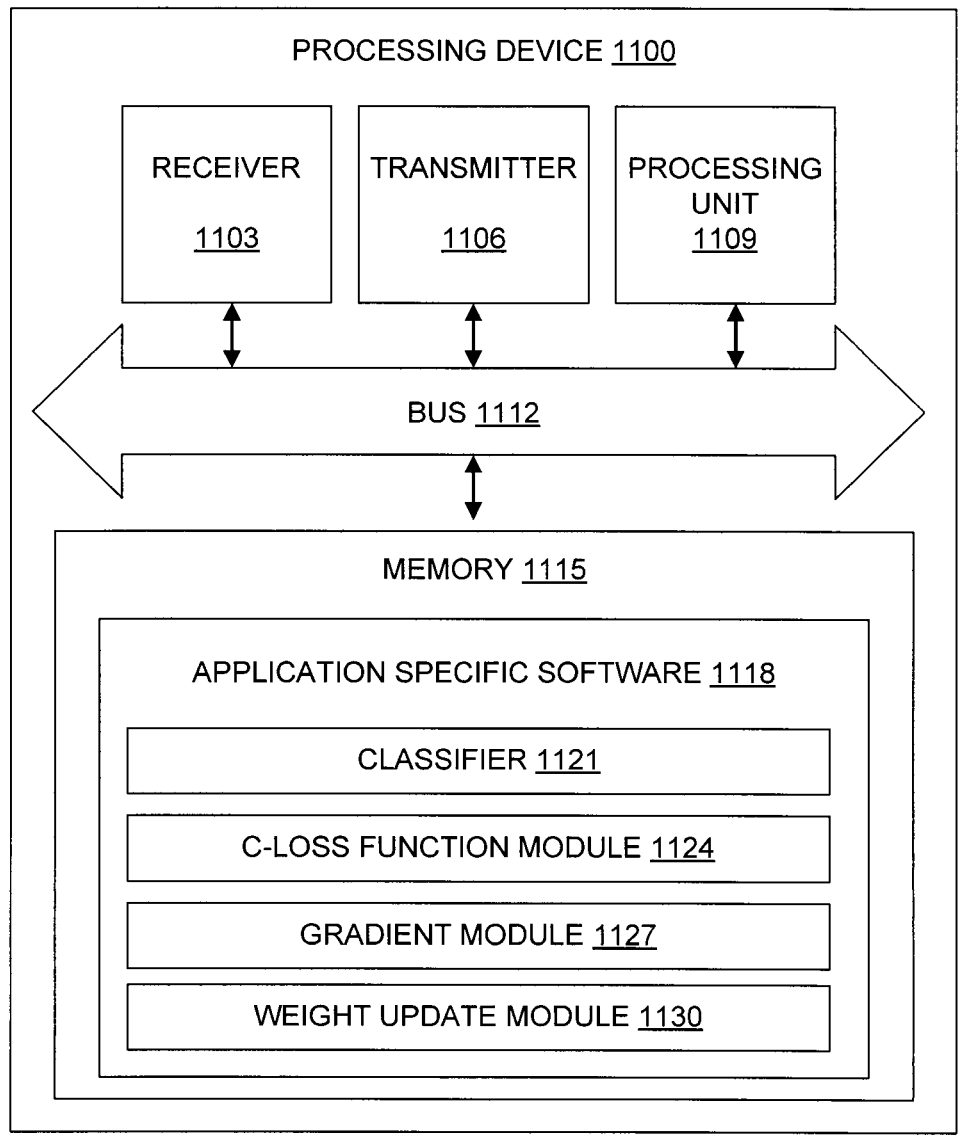
FIG. 11 is a graphical representation of an example of a processing device used to implement at least a portion of the systems of FIGS. 4 and 6 in accordance with various embodiments of the present disclosure.

In some embodiments, the adaptive systems described above may be implemented in a processing device 1100 such as the one illustrated in FIG. 11. The signal processing device 1100 includes a receiver 1103, transmitter 1106, processing unit 1109, a bus 1112 and a memory 1115. The memory 1115 stores an application specific software 1118 including modules that include instructions that when executed by the processing unit 1109 perform various operations. In the embodiment illustrated in FIG. 11, the modules include, for example, classifier 1121, a c-loss module 1124, a gradient-based module 1127, and weight update module 1130. In other embodiments, the application software includes a combination loss function module configured to apply a combination of a c-loss function and a square loss function to an input predicted label and an actual label.

The application specific software 1118 can also be stored on a variety of computer-readable media for use by, or in connection with, a variety of computer-related systems or methods. In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

Any process descriptions or blocks should be understood as representing modules, segments, or portions of code which include one or more executable instructions for implementing specific logical functions or steps in the process, and alternate implementations are included within the scope of the embodiments described in the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments in the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A classifying device comprising:
    a processing unit; and
    a memory storing instructions in modules that when executed by the processing unit cause the classifying device to carry out a method comprising:
        adaptively classifying data values using a correntropy loss function, wherein adaptively classifying the data values comprises, in response to classifying a data value,
        calculating, based at least in part on the correntropy loss function, a correntropy statistical similarity between a predicted label for the data value determined by the classifying the data value and an actual label for the data value; and
        adjusting at least one weight of a plurality of weights of the classifying device based at least in part on the correntropy statistical similarity.

2. The classifying device of claim 1, wherein the stored instructions includes a classifier module that when executed by the processing unit is configured to predict a label for the data value using a discriminant function, the discriminant function including the plurality of weights based at least in part upon the con-entropy loss function.

3. The classifying device of claim 2, wherein the stored instructions further includes a weight update module that when executed by the processing unit is configured to perform the adjusting of the at least one of the plurality of weights.

4. The classifying device of claim 3, wherein adjusting the at least one weight comprises adjusting the at least one weight based at least in part upon a minimized correntropy expected risk based at least in part on the correntopy statistical similarity.

5. A method comprising:
classifying a first data value using a classifier to identify a predicted label for the first data value;
adjusting a weight of a classifier based at least in part on a correntropy statistical similarity between the predicted label for the first data value and an actual label for the first data value; and
classifying a second data value using the classifier.

6. The method of claim 5, wherein classifying the second data value comprises predicting a second label for the second data value using a discriminant function, the discriminant function including the adjusted weight.

7. The method of claim 6, further comprising providing the second label for rendering on a display device.

8. The method of claim 5, wherein a plurality of weights are updated based at least in part on a change in a correntropy loss function signal.

9. The method of claim 5, wherein the change in the correntropy loss function signal is based upon the correntropy statistical similarity between the predicted label and the actual label, the correntropy statistical similarity based at least in part on a correntropy loss function.

10. A method comprising:
classifying a data value by predicting a label for the data value using a discriminant function, wherein the discriminant function includes at least one weight;
determining a correntropy statistical similarity between the predicted label and an actual label based at least in part on a correntropy loss function;
minimizing an expected risk associated with the predicted label based at least in part on the correntropy statistical similarity; and
updating at least one weight based at least in part on the expected risk minimized based at least in part on the correntropy statistical similarity.

11. The method of claim 10, wherein determining the correntopy statistical similarity between the predicted label and the actual label is also based at least in part on a square loss function.

12. The method of claim 11, wherein the determined correntopy statistical similarity is based at least in part on a weighted combination of a correntropy loss function and a square loss function.

13. The method of claim 10, further comprising obtaining the data value.

14. A system comprising:
at least one processor; and
at least one storage medium having encoded thereon executable instructions that, when executed by the at least one processor, cause the at least one processor to act as:
a classifier configured to predict a label for the data value using a discriminant function, the discriminant function including a plurality of weights;
a loss function module configured to determine a correntropy statistical similarity between the predicted label and an actual label based at least in part on a correntropy loss function;
a gradient-based module configured to calculate a change in the correntropy statistical similarity; and
a weight update module configured update the plurality of weights based at least in part on the correntropy statistical similarity and the change in the correntropy statistical similarity.

15. The system of claim 14, wherein the gradient-based module is a first, second or mixed order gradient-based module.

16. The system of claim 14, wherein the gradient-based module is a second order gradient-based module configured to calculate a change in the correntropy statistical similarity using a Newtonian method.

17. The system of claim 14, wherein the gradient-based module is a mixed order gradient-based module configured to calculate a change in the correntropy statistical similarity using a Hessian approximation method.

18. The system of claim 14, wherein the gradient-based module is a conjugate gradient-based module.

* * * * *

UNITED STATES PATENT AND TRADEMARK OFFICE
CERTIFICATE OF CORRECTION

Page 1 of 1

PATENT NO.        : 9,269,050 B2
APPLICATION NO.   : 13/811317
DATED             : February 23, 2016
INVENTOR(S)       : Jose Carlos Principe et al.

It is certified that error appears in the above-identified patent and that said Letters Patent is hereby corrected as shown below:

In the claims:

Col. 10, claim 2, line 65, "con-entropy" should read -- correntropy --.

Signed and Sealed this
Twenty-sixth Day of July, 2016

Michelle K. Lee
*Director of the United States Patent and Trademark Office*